(12) United States Patent
Yoshida et al.

(10) Patent No.: US 12,474,018 B2
(45) Date of Patent: Nov. 18, 2025

(54) FUEL SUPPLY APPARATUS AND FUEL SUPPLY METHOD

(71) Applicant: Tatsuno Corporation, Tokyo (JP)

(72) Inventors: Yuichi Yoshida, Tokyo (JP); Satomi Ohishi, Tokyo (JP)

(73) Assignee: TATSUNO CORPORATION

( * ) Notice: Subject to any disclaimer, the term of this patent is extended or adjusted under 35 U.S.C. 154(b) by 81 days.

(21) Appl. No.: 18/413,511

(22) Filed: Jan. 16, 2024

(65) Prior Publication Data

US 2024/0240755 A1    Jul. 18, 2024

(30) Foreign Application Priority Data

Jan. 18, 2023   (JP) ................ 2023-005560

(51) Int. Cl.
F17C 5/00   (2006.01)

(52) U.S. Cl.
CPC ...... *F17C 5/007* (2013.01); *F17C 2201/0109* (2013.01); *F17C 2201/056* (2013.01); *F17C 2205/0134* (2013.01); *F17C 2205/0352* (2013.01); *F17C 2221/012* (2013.01); *F17C 2250/043* (2013.01); *F17C 2250/0439* (2013.01); *F17C 2265/065* (2013.01); *F17C 2270/0168* (2013.01); *F17C 2270/0184* (2013.01)

(58) Field of Classification Search
CPC .............. F17C 5/007; F17C 2270/0184; F17C 2265/065; F17C 2221/012; F17C 2221/011
See application file for complete search history.

(56) References Cited

U.S. PATENT DOCUMENTS

| 10,295,121 | B2 * | 5/2019 | Handa | F17C 13/028 |
| 11,370,651 | B2 * | 6/2022 | Natori | F17C 5/06 |
| 11,808,410 | B2 * | 11/2023 | Yoshida | F17C 13/025 |

FOREIGN PATENT DOCUMENTS

| JP | 2011122657 A | * | 6/2011 |
| JP | 6737350 A | | 8/2020 |
| JP | 2021196051 A | | 12/2021 |

* cited by examiner

*Primary Examiner* — Timothy L Maust
(74) *Attorney, Agent, or Firm* — Stetina Garred Brucker & Newboles

(57) ABSTRACT

A fuel supply apparatus includes a plurality of supply systems; a supply control device provided in each of the supply systems; a supply pipe communicating each of the supply systems and each of rear facilities; a supply member interposed in the supply pipe and connected to each of the supply control devices; and a supply hose connected to the supply pipe, the supply hose having a supply nozzle at its tip, wherein the supply control device includes: a function of determining whether or not communication filling is established in one side of the supply system/or the other side of the supply system; and when communication filling is not established in the supply system on the one side and communication filling is established in the supply system on the other side, a function of supplying using vehicle side data in the supply system on the other side.

8 Claims, 5 Drawing Sheets

[Fig. 1]
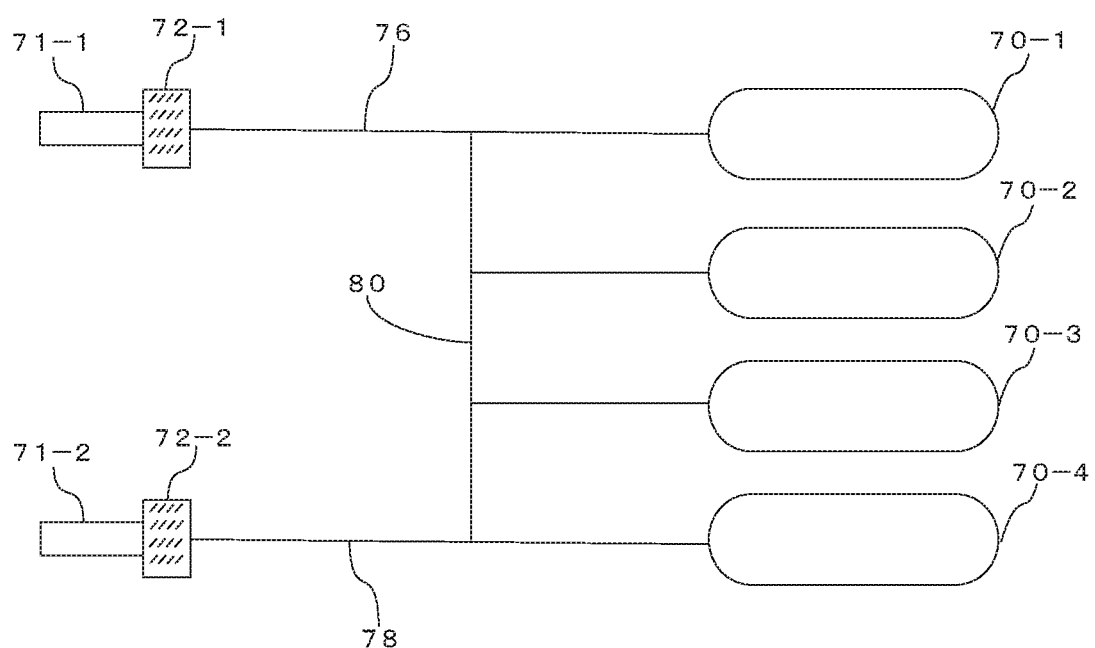

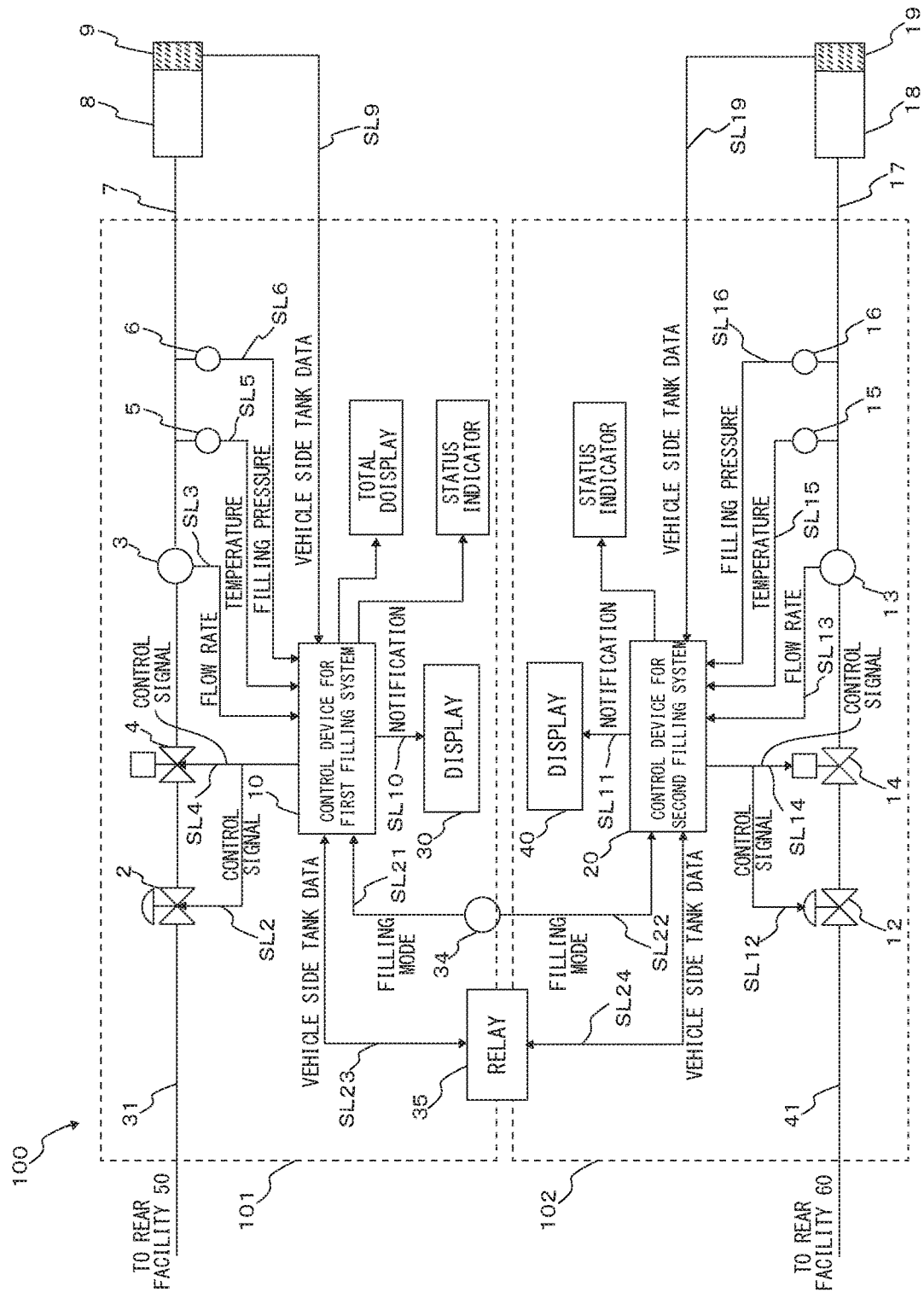
[Fig. 2]

[Fig. 3]
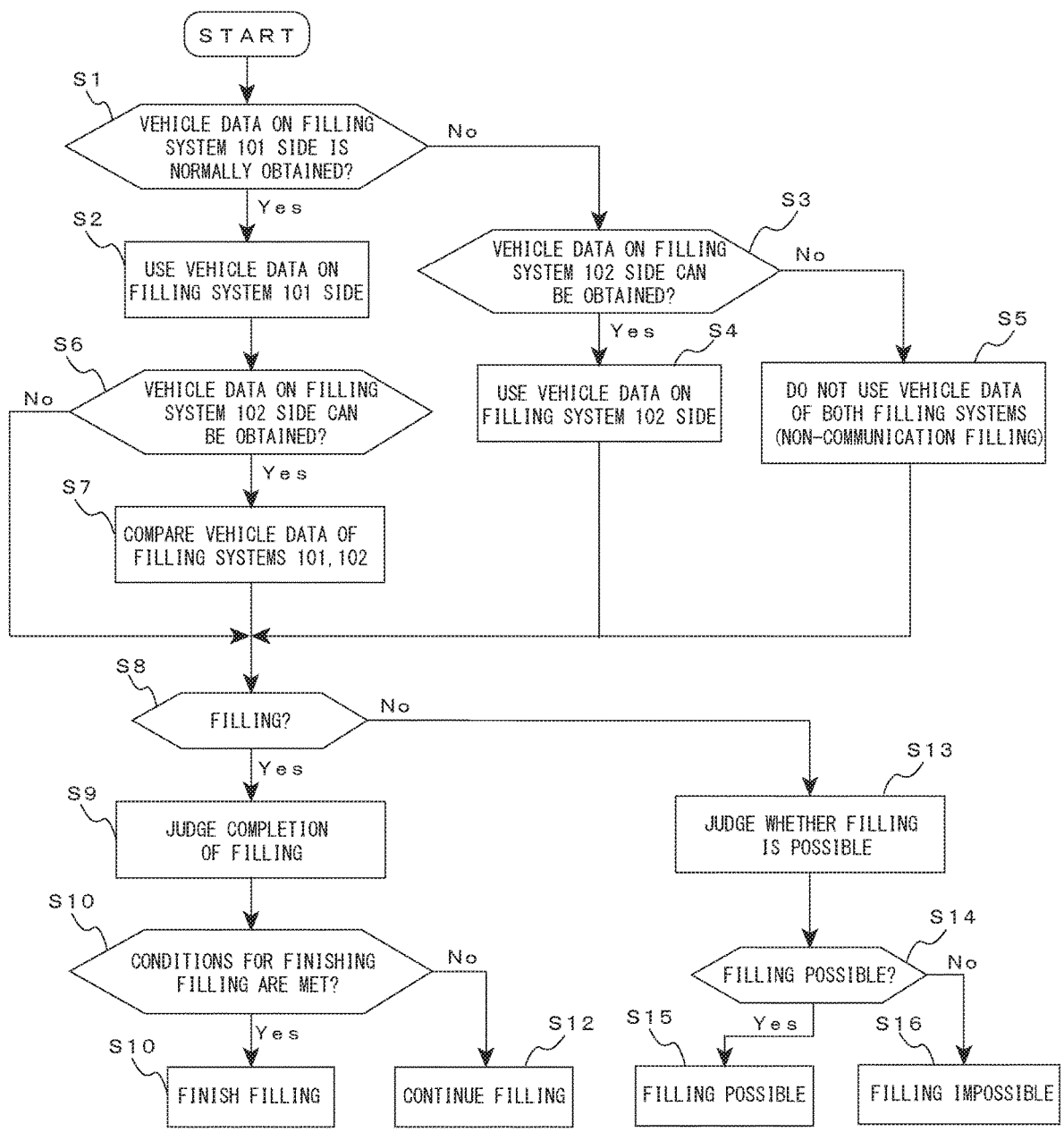

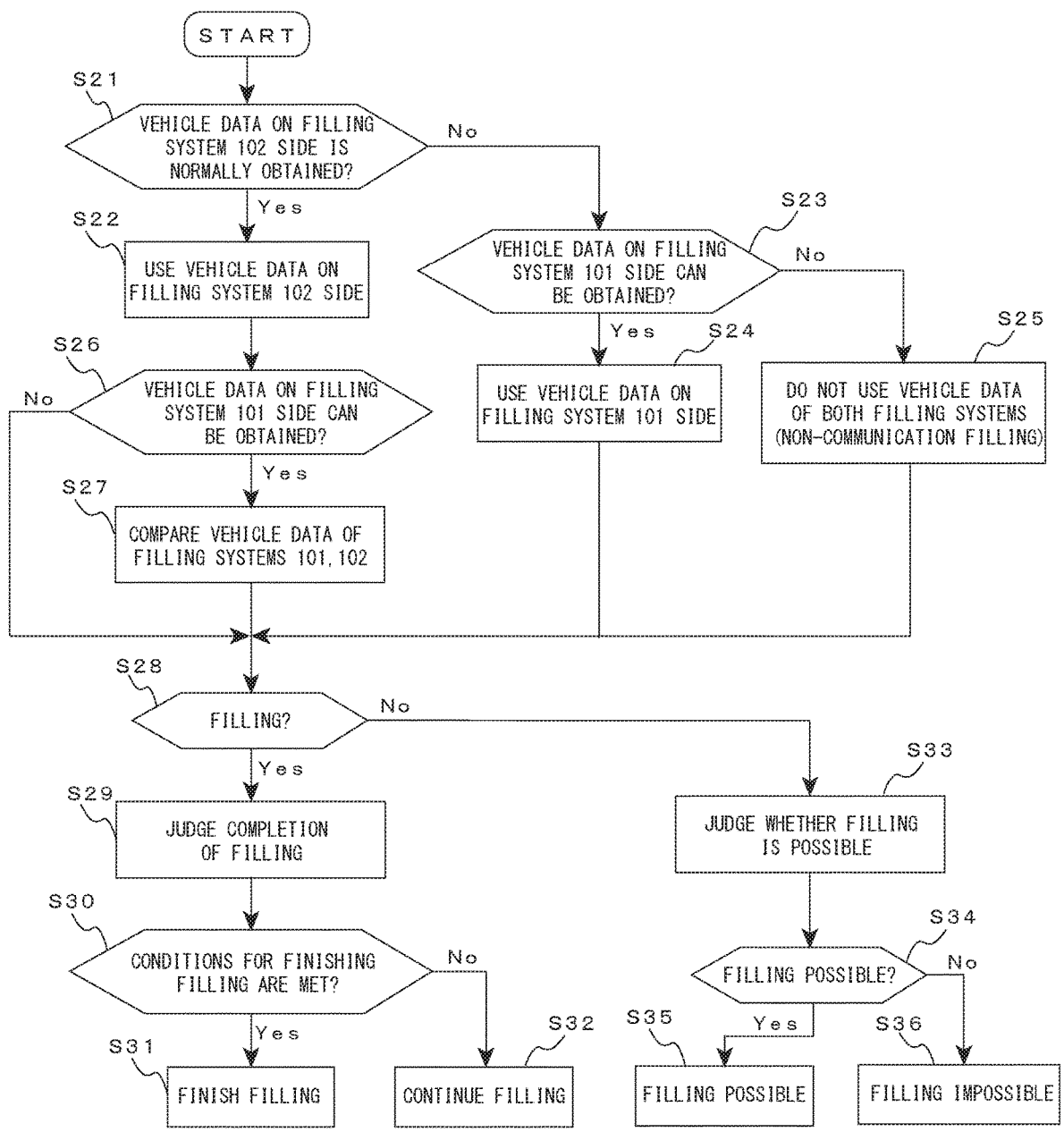
[Fig. 4]

[Fig. 5]
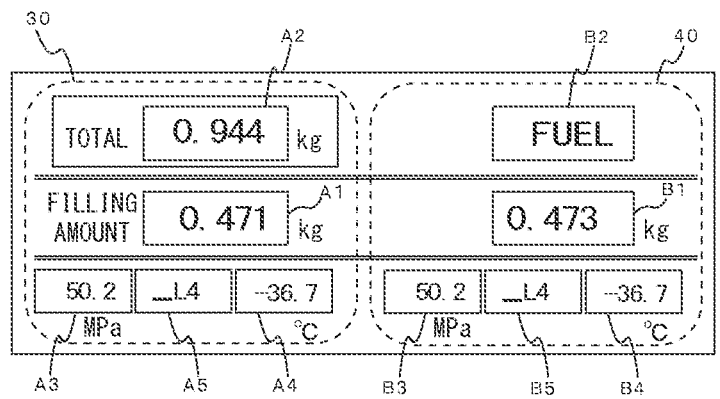
[Fig. 6A]
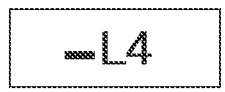
[Fig. 6B]
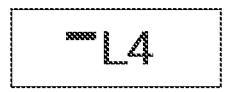
[Fig. 6C]
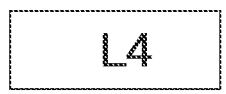
[Fig. 7A]
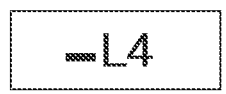
[Fig. 7B]
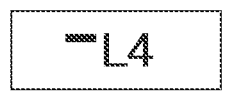
[Fig. 7C]
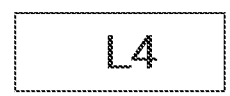

FUEL SUPPLY APPARATUS AND FUEL SUPPLY METHOD

CROSS-REFERENCE TO RELATED APPLICATIONS

The present application claims priority to Japanese Patent Application No. 2023-005560 filed on Jan. 18, 2023, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a fuel supply apparatus and a fuel supply method for, for example, filling a fuel tank of a fuel cell vehicle with hydrogen gas as fuel.

2. Description of the Related Art

In connection with increasing awareness of environmental issues in recent years, vehicles that use hydrogen gas as fuel (such as fuel cell vehicles) have become popular. The applicant has previously been proposed a fuel supply apparatus that performs filling operations on such vehicles by obtaining information on the temperature and pressure inside the tank on the vehicle side (this method is referred to as "communication filling"), and when the communication filling is not established, performs non-communication filling operations of hydrogen while maintaining a highly safe state (see JP-B-6737350 gazette).

Fuel cell vehicles are being developed not only for passenger cars but also for large trucks and buses used for logistics. Here, large trucks and buses are equipped with multiple large-capacity fuel tanks in consideration of traveling long distances. When supplying hydrogen to a large truck equipped with multiple large-capacity fuel tanks using a single filling nozzle to fill it, depending on the diameter of a filling pipe in a fuel supply system, the amount of hydrogen in rear equipment, and the capacity of a compressor, the filling time may be very long. On the other hand, when filling large trucks and buses with hydrogen gas, it is necessary to comply with filling protocols. Therefore, in order to efficiently fill hydrogen into a vehicle equipped with a plurality of fuel tanks, the applicant has proposed a fuel supply apparatus equipped with a plurality of filling systems, in which each filling nozzle of the plurality of filling systems can be connected to a receptacle in communication with each of the plurality of fuel tanks and can switch control modes depending on whether or not the plurality of fuel tanks are in communication with each other (see JP-A-2021-196051 gazette).

The contents of JP-B-6737350 gazette and JP-A-2021-196051 gazette are incorporated herein by reference in their entirety.

BRIEF SUMMARY

Here, although in a plurality of supply systems, communication filling may not be established in any or all of the supply systems for some reason, the prior art disclosed in JP-B-6737350 gazette does not disclose a case where each filling nozzle of a plurality of filling systems is connected to each of a plurality of receptacles of a vehicle having a plurality of fuel tanks to supply fuel. In addition, in the conventional technology according to JP-A-2021-196051 gazette, control mode can be switched depending on whether or not a plurality of fuel tanks of the vehicle is communicating with each other, but there is no disclosure of switching control mode depending on whether or not the communication filling is established in each of the plurality of supply systems.

The present invention is proposed in view of the problems of the prior art described above, and an object of the present invention is to provide a fuel supply apparatus and a fuel supply method that can perform control corresponding to whether or not communication filling is established in each of a plurality of supply systems while observing a filling protocol, and can quickly supply hydrogen gas to a vehicle equipped with a plurality of large-capacity fuel tanks.

A fuel supply apparatus (100) according to the present invention is characterized by including: a plurality of supply systems (101, 102); a supply control device (10, 20) provided in each of the supply systems (101, 102); a supply pipe (31, 41) communicating each of the supply systems (101, 102) and each of rear facilities (50, 60); a supply member (for example, flow rate regulating valves 2, 12, cutoff valves 4, 14, flow meters 3, 13, thermometers 5, 15, pressure gauges 6, 16) interposed in the supply pipe (31, 41) and connected to each of the supply control devices (10, 20); and a supply hose (7, 17) connected to the supply pipe (31, 41), the supply hose (7, 17) having a supply nozzle (8, 18) at its tip, wherein the supply control device (10, 20) includes: a function of determining whether or not communication filling is established in one side of the supply system (101) and/or the other side of the supply system (102); and when communication filling is not established in the supply system (101) on the one side and communication filling is established in the supply system (102) on the other side, a function of supplying using vehicle side data (for example, temperature and pressure inside the tank) in the supply system (102) on the other side.

In the present invention, it is preferable that the supply control device (10, 20) has a function of notifying when an abnormality occurs in any of the supply systems. Here, the function of notifying the abnormality is, for example, when communication filling is not established on the one side, displaying information, on a display (30, 40), that the one side is being supplied using vehicle data on the other side.

It is preferable that the supply apparatus (100) further including a function of stopping supplying in the supply system (101) on the one side and in the supply system (102) on the other side when communication filling is not established in the supply system (101) on the one side and communication filling is established in the supply system (102) on the other side, and when a temperature of a container on a vehicle side connected to the supply system (102) on the other side exceeds a predetermined value (for example, 85° C.); when a fuel supply pressure exceeds a pressure that can be supplied to the vehicle-side container (tank) that is calculated from the temperature of the vehicle-side container connected to the other side supply system (102); or when a supply stop signal is received from the vehicle side in the other side supply system (102).

A fuel supply method used for a fuel supply apparatus (100) including: a plurality of supply systems (101, 102); a supply control device (10, 20) provided in each of the supply systems (101, 102); a supply pipe (31, 41) for communicating each of the supply systems (101, 102) and each of rear facilities (50, 60); a supply member (for example, flow rate regulating valves 2, 12, cutoff valves 4, 14, flow meters 3, 13, thermometers 5, 15, pressure gauges 6, 16) interposed in the supply pipe (31, 41) and connected to each of the supply control devices (10, 20); and a supply hose (7, 17) connected to the supply pipe (31, 41), the supply hose (7, 17) having a supply nozzle (8, 18) at its tip, the fuel supply method is characterized by including the steps of: determining whether or not communication filling is established in one side of the supply system (101) and/or the other side of the supply system (102); and when communication filling is not established in the supply system (101) on the one side and communication filling is established in the supply system (102) on the other side, supplying using vehicle side data (for example, temperature and pressure inside the tank) in the supply system (102) on the other side.

In the present invention, it is preferable to have an abnormality notification step of notifying when an abnormality occurs in any of the supply systems. Here, in the abnormality notification step, for example, when communication filling is not established on the one side, information indicating that the one side is being supplied using vehicle data on the other side may be displayed on a display (30, 40).

It is preferable that the supply method further including a step of stopping supplying in the supply system (101) on the one side and in the supply system (102) on the other side when communication filling is not established in the supply system (101) on the one side and communication filling is established in the supply system (102) on the other side, and when a temperature of a container on a vehicle side connected to the supply system (102) on the other side exceeds a predetermined value (for example, 85° C.); when a fuel supply pressure exceeds a pressure that can be supplied to the vehicle-side container that is calculated from the temperature of the vehicle-side container connected to the other side supply system (102); or when a supply stop signal is received from the vehicle side in the other side supply system (102).

In the present invention, the supplied fuel includes hydrogen, gaseous fuels other than hydrogen, and liquid fuels such as CNG, LPG, and liquid hydrogen.

In a vehicle equipped with a plurality of large-capacity fuel tanks (70), a plurality (for example, two) of fuel supply receptacles (71) are provided, and according to the present invention having the above-described configuration, attaching the supply nozzles (8, 18) in a plurality of (for example two) supply systems (101, 102) to the plurality of receptacles (71) of a large truck or bus and supplying fuel with the supply nozzles (8, 18) enable to supply hydrogen in a much shorter time than when supplying hydrogen by individually attaching a single supply nozzle to each of the plurality of receptacles (71).

Here, from the results of the inventor's experiments and research, we found that it is possible to perform control based on the premise that when the supply nozzles (8, 18) of the fuel supply apparatus (100) of the present invention with a plurality of supply systems (101, 102) are connected to receptacles (71) of a vehicle equipped with a plurality of large-capacity fuel tanks (70), the same signal is sent from the vehicle to each of the plurality of supply systems (101, 102) in the fuel supply apparatus (100). In the present invention, if various parameters (temperature, pressure) sent to each of the plurality of supply systems (101, 102) are not the same, or if safety is affected, the supply can be stopped. Therefore, in the present invention, fuel supply is performed based on the above-mentioned premise. According to the present invention, if communication filling is not established in the one side supply system (101), and communication filling is established in the supply system (102) on the other side, the vehicle data in the supply system (102) on the other side is used for supply, and communication filling can be performed in both the supply systems (101, 102). Since communication filling is performed in both the supply systems (101, 102), it is possible to supply a vehicle's fuel tank with high pressure compared to the case of non-communication filling in the supply systems (101, 102). Therefore, supply efficiency is particularly improved for vehicles having multiple fuel tanks (70) and multiple receptacles (71).

In the present invention, when communication filling is not established in the supply system (101) on the one side and communication filling is established in the supply system (102) on the other side, and when a temperature of a container on a vehicle side connected to the supply system (102) on the other side exceeds a predetermined value (e.g. 85° C.); when a fuel supply pressure exceeds a pressure that can be supplied to the vehicle-side container that is calculated from the temperature of the vehicle-side container connected to the other side supply system (102); or when a supply stop signal is received from the vehicle side, supplying in the supply system (101) and in the supply system (102) can be stopped. With this, even if fuel is supplied at a higher pressure in both supply systems (101, 102) than in the case of non-communicating filling, safety can be ensured.

In addition, in the present invention, notifying an abnormality in any of the supply systems improves safety in fuel supply.

BRIEF DESCRIPTION OF THE DRAWINGS

FIG. 1 shows an arrangement of fuel tanks and hydrogen filling receptacles in a vehicle equipped with multiple fuel tanks, in which multiple paths connecting the fuel tanks and hydrogen filling receptacles communicate within the vehicle.

FIG. 2 is a block diagram of a fuel supply apparatus (hydrogen filling apparatus) according to an embodiment of the present invention.

FIG. 3 is a flowchart showing control on the first hydrogen filling system side.

FIG. 4 is a flowchart showing control on the second hydrogen filling system side.

FIG. 5 is an explanatory diagram showing a display of a fuel supply apparatus according to an embodiment of the present invention.

FIG. 6A is an explanatory diagram of a display related to communication filling on a display on the first hydrogen filling system side.

FIG. 6B is an explanatory diagram of a display related to communication filling on a display on the first hydrogen filling system side.

FIG. 6C is an explanatory diagram of a display related to communication filling on a display on the first hydrogen filling system side.

FIG. 7A is an explanatory diagram of a display related to communication filling on a display on the second hydrogen filling system side.

FIG. 7B is an explanatory diagram of a display related to communication filling on a display on the second hydrogen filling system side.

FIG. 7C is an explanatory diagram of a display related to communication filling on a display on the second hydrogen filling system side.

DETAILED DESCRIPTION

Embodiments of the present invention will be described below with reference to the accompanying drawings. In the illustrated embodiment, the fuel to be supplied is hydrogen. First, with reference to FIG. 1, a hydrogen filling system for a vehicle equipped with a plurality of large capacity fuel tanks will be described. A large vehicle with a simplified fuel system shown in FIG. 1 is equipped with multiple fuel tanks 70 (four in FIG. 1: 70-1 to 70-4), and multiple (two in FIG. 1) filling receptacles 71-1 and 71-2. A path 76 communicating with the hydrogen filling receptacle 71-1 and a path 78 communicating with the hydrogen filling receptacle 71-2 communicate within the vehicle via a path 80. Therefore, the four fuel tanks 70-1 to 70-4 are also communicated within the vehicle via the path 80. Reference numerals 72-1 and 72-2 are transmitters for transmitting vehicle data (temperature and pressure inside the tank) used in communication filling.

Next, with reference to FIG. 2, a hydrogen filling device for suitably filling the vehicle with hydrogen will be described. In FIG. 2, the hydrogen filling apparatus 100 according to the illustrated embodiment has two hydrogen filling systems 101 and 102 (a first hydrogen filling system and a second hydrogen filling system). Each has a filling control device, a display, a filling pipe, a filling member (a flow rate regulating valve, a flow meter, etc.), a filling nozzle, and others. The first hydrogen filling system 101 includes a filling control device 10, a display 30, and a filling pipe 31. The upstream side (left side in FIG. 2) of the filling pipe 31 communicates with a rear facility (hydrogen gas supply source) 50, and the other end (right side in FIG. 2) connects to a filling nozzle 8 via a filling hose 7. The filling pipe 31 is provided with a flow rate regulating valve 2, a cutoff valve 4, a flow meter 3 (mass flow meter), a thermometer 5, and a pressure gauge 6 as filling members. The flow rate regulating valve 2, the cutoff valve 4, the flow meter 3, the thermometer 5, and the pressure gauge 6 are connected to the filling control device 10 via signal transmission lines SL2, SL4, SL3, SL5, and SL6, respectively. Further, a vehicle data light receiving section 9 provided in the filling nozzle 8 and the filling control device 10 are connected via a signal transmission line SL9. Furthermore, the display 30 is connected to the filling control device 10 via a signal transmission line SL10.

In FIG. 2, the hydrogen gas stored in the rear facility 50 of the first hydrogen filling system 101 flows through the filling hose 7 via the flow rate regulating valve 2, the shutoff valve 4, and the flow meter 3 through the filling pipe 31, and it is filled into a fuel tank of a vehicle (not shown) through the filling nozzle 8. The filling control device 10, which functions as a control unit of the first hydrogen filling system 101, acquires the measurement results of the flow meter 3, the thermometer 5, and the pressure gauge 6 via the signal transmission lines SL3 and others, and transmits a flow rate control signal to the flow rate regulating valve 2 through the signal transmission line SL2. Furthermore, when finishing or stopping filling, the filling control device 10 transmits a control signal to the flow rate regulating valve 2 and the cutoff valve 4 via the signal transmission lines SL2 and SL4, respectively, to control the flow rate regulating valve 2 and to close the shutoff valve 4. The measurement result of the pressure gauge 6 is a filling pressure of hydrogen gas filled during non-communication filling. The measurement results of the thermometer 5 and the pressure gauge 6 are used both during communication filling and non-communication filling.

The vehicle data light receiving section 9 provided in the filling nozzle 8 transmits data (tank internal pressure, temperature, filling amount, etc.) from the vehicle side tank 70 (FIG. 1) to the filling control device 10 via the signal transmission line SL9. The filling control device 10 has a function of sending and receiving information or control signals to and from the flow rate regulating valve 2, the cutoff valve 4, the flow meter 3, the thermometer 5, and the pressure gauge 6 of the first hydrogen filling system 101; acquiring data on the vehicle side tank 70; supplying hydrogen gas to the vehicle side tank 70 in an appropriate temperature range and/or pressure range; and executing hydrogen filling (communication filling) in compliance with a filling protocol. Furthermore, the filling control device 10 has a function of performing non-communication filling without using the data of the vehicle tank 70 when the data of the vehicle tank 70 cannot be acquired and communication filling cannot be performed. The filling control device 10 can determine whether communication filling is successful or not based on whether data in the vehicle tank 70 has been acquired.

In FIG. 2, the second hydrogen filling system 102 has a filling control device 20, a display 40, and a filling pipe 41. The filling pipe 41 has an upstream side (left side in FIG. 2) communicating with a rear facility (hydrogen gas supply source) 60 and the other end (right side in FIG. 2) connected to a filling nozzle 18 via a filling hose 17. The filling pipe 41 is provided with a flow rate regulating valve 12, a cutoff valve 14, a flow meter (mass flow meter) 13, a thermometer 15, and a pressure gauge 16 as filling members. The flow rate regulating valve 12, the cutoff valve 14, the flow meter 13, the thermometer 15, and the pressure gauge 16 are connected to the filling control device 20 through signal transmission lines SL12, SL14, SL13, SL15, and SL16, respectively. Further, an vehicle data light receiving section 19 provided in the filling nozzle 18 and the filling control device 20 are connected via a signal transmission line SL19. Furthermore, the display 40 is connected to the filling control device 20 via a signal transmission line SL11.

In FIG. 2, hydrogen gas stored in the rear facility 60 of the second hydrogen filling system 102 flows through the filling hose 17 via the flow rate regulating valve 12, the shutoff valve 14, and the flow meter 13 through the filling pipe 41, and the gas is filled in a fuel tank of a vehicle (not shown) through the filling nozzle 18. Exchange of information and control signals between the filling control device 20 of the second hydrogen filling system 102, the flow rate regulating valve 12, the cutoff valve 14, the flow meter 13, the thermometer 15, and the pressure gauge 16 (the transmission and reception of information (measurement data or control signals) from the vehicle data light receiving unit 19) on the vehicle side tank 70 (FIG. 1) is the same as that of the first hydrogen filling system 101, and a duplicate explanation will be avoided. The filling control device 20 of the second hydrogen filling system 102 also has a function to execute hydrogen filling (communication filling) that complies with the filling protocol. Furthermore, if data of the vehicle side tank 70 cannot be acquired and communication filling cannot be performed, the filling control device 20 has a function to perform non-communication filling that does not use data from the vehicle tank 70. The filling control device 20 has a function to determine whether to perform communication filling or non-communication filling depending on whether temperature data and pressure data can be acquired from the vehicle tank 70.

In FIG. 2, the hydrogen filling device 100 is provided with a select switch 34, which selects a filling mode in which filling is performed using only a single filling nozzle (filling is performed using only one of filling nozzles 8 and 18), or the other mode in which filling is performed using two filling nozzles (filling with both filling nozzles 8 and 18). The filling mode selected by the select switch 34 is transmitted to the filling control device 10 of the first hydrogen filling system 101 via the signal transmission line SL21, and to the control device 20 of the second hydrogen filling system 102 via the signal transmission line SL22. In FIG. 2, the filling control device 10 of the first hydrogen filling system 101 and the filling control device 20 of the second hydrogen filling system 102 are connected via a relay 35. The filling control device 10 of the first hydrogen filling system 101 and the relay 35 are connected via a signal transmission line SL23, and the filling control device 20 of the second hydrogen filling system 102 and the relay 35 are connected via a signal transmission line SL24.

In the illustrated embodiment, for example, when communication filling is not established in the first hydrogen filling system 101 and communication filling is established in the second hydrogen filling system 102, the hydrogen filling control device 10 of the first hydrogen filling system 101 performs hydrogen filling using information of the hydrogen filling control device 20 on the second hydrogen filling system 102 transmitted from the vehicle tank 70. On the other hand, when communication filling is not established in the second hydrogen filling system 102 and communication filling is established in the first hydrogen filling system 101, the hydrogen filling control device 20 on the second hydrogen filling system 102 side performs filling using the temperature and pressure information transmitted from the vehicle side tank 70 on the first hydrogen filling system 101 side.

Although not clearly shown in FIG. 2, control is performed on the premise that the same signal is sent from the vehicle side (tank 70) to each of the filling nozzle 8 of the first hydrogen filling system 101 and the filling nozzle 18 of the second hydrogen filling system 102. If the various parameters (temperature, pressure) sent to the first hydrogen filling system 101 and the various parameters (temperature, pressure) sent to the second hydrogen filling system 102 differ by more than a predetermined value, filling is stopped, as described below. Therefore, there is no problem even if the filling control is performed on the above-mentioned premise.

In FIG. 2, in the hydrogen filling apparatus 100 according to the illustrated embodiment, for example, even if communication filling is not established in the first hydrogen filling system 101, as long as communication filling is established in the second hydrogen filling system 102, information from the vehicle side of the second hydrogen filling system 102 can be used in the first hydrogen filling system 101. Therefore, communication filling can be continued in the first hydrogen filling system 101 as well, so that hydrogen filling can be performed up to a higher-pressure region. Even if communication filling in the first hydrogen filling system 101 is not established, safety is ensured by switching communication filling to non-communication filling or stopping hydrogen filling. Specific control will be described later.

Referring to FIG. 2, controls in the first to fourth aspects of the control by the hydrogen filling control device 10 on the first hydrogen filling system 101 side and the hydrogen filling control device 20 on the second hydrogen filling system 102 side will be explained. In the control according to the first aspect, for example, if communication filling is not established in the first hydrogen filling system 101 and communication filling is established only in the second hydrogen filling system 102, the first hydrogen filling system 101 acquires the vehicle side information received by the second hydrogen filling system 102, and performs communication filling using it. That is, when vehicle data (temperature, pressure, etc.) on the first hydrogen filling system 101 side cannot be acquired normally when the first hydrogen filling system 101 and the second hydrogen filling system 102 are simultaneously filling, if the vehicle data (temperature, pressure, etc.) received on the second hydrogen filling system 102 side is valid, the hydrogen filling control device 10 on the first hydrogen filling system 101 side uses the vehicle data (temperature, pressure, etc.) from the relay 35 to continue communication filling. In this case, since communication filling can be performed in both the first and second hydrogen filling systems 101 and 102, compared to the case of non-communication filling, the vehicle's fuel tank to be filled to high pressure. Therefore, the filling efficiency is particularly improved for a vehicle having a plurality of fuel tanks 70 (FIG. 1) and a plurality of receptacles 71 (FIG. 1). In the control according to the first aspect, the display 30 displays that the first hydrogen filling system 101 uses vehicle data on the second hydrogen filling system 102 side for communication filling. The display contents of the displays 30 and 40 will be described later with reference to FIGS. 5 to 7. Here, "simultaneous filling" means that the filling nozzle 8 on the first hydrogen filling system 101 side and the filling nozzle 18 on the second hydrogen filling system 102 side are each connected to the receptacles on vehicle side, and communication filling is performed. Furthermore, "vehicle data is valid" means that valid data can be received between the two for 500 mSec (SAEJ2799 standard).

As described above, the information or signal that the first hydrogen filling system 101 would have acquired is assumed to be identical to the information or signal that the second hydrogen filling system 102 has acquired. That is, as described above, control is performed on the premise that the same signal is sent from the vehicle to each of the first hydrogen filling system 101 and the second hydrogen filling system 102. A determination as to whether or not hydrogen filling should be stopped is made based on a signal from the vehicle side with which the second hydrogen filling system 102 communicates. Then, when the vehicle data on the second hydrogen filling system 102 side becomes a condition for stopping hydrogen filling, the hydrogen filling in the first and second hydrogen filling systems 101 and 102 is promptly finished. Or, if the state is "other than filling", such as a stage before hydrogen filling, the filling operation will not proceed.

The control according to the first aspect is a case where communication filling is not established in the first hydrogen filling system 101 and communication filling is established only in the second hydrogen filling system 102, but the control according to the second aspect is a case where communication filling is not established in the second hydrogen filling system 102 and communication filling is established only in the first hydrogen filling system 101. In the control according to the second aspect, the second hydrogen filling system 102 acquires vehicle data (temperature, pressure, etc.) via the relay 35 to continue communication filling. Then, the display 40 displays that the second hydrogen filling system 102 is performing communication filling using the vehicle data on the first hydrogen filling system 101 side. When the vehicle data on the first hydrogen filling system 101 side indicates a state in which hydrogen filling should be stopped, hydrogen filling in the first and second hydrogen filling systems 101 and 102 is promptly ended. The control according to the second aspect is the exact opposite of the control according to the first aspect, and redundant explanation will be omitted.

The control according to the third aspect is performed when the first hydrogen filling system 101 and the second hydrogen filling system 102 are simultaneously filled (when communication filling is established in both), and the vehicle data (tank pressure, tank temperature) received at the first hydrogen filling system 101 and the vehicle data (tank pressure, tank temperature) received at the second hydrogen filling system 102 are not the same. If the vehicle data of the first hydrogen filling system 101 and the vehicle data of the second hydrogen filling system 102 differ by a threshold value or more, the hydrogen filling control device 10 and/or the hydrogen filling control device 20 determine that an abnormality has occurred in the vehicle data, and communication fillings in the hydrogen filling systems 101 and 102 are stopped. Thereafter, the hydrogen filling systems 101 and 102 perform non-communication filling. Compared to communication filling, non-communication filling allows filling only in a range where the pressure of the tank on the vehicle side is low. Therefore, the safety of the vehicle is guaranteed compared to the case of communication filling. The displays 30 and 40 indicate that a difference of more than a threshold value has occurred between the vehicle data received by the first and second hydrogen filling systems 101 and 102, and that communication filling has been switched to non-communication filling.

In FIG. 2, the vehicle data (pressure, temperature) received by both the first and second hydrogen filling systems 101 and 102 are not the same, and the difference exceeding the threshold value occurs in the following cases. For example, although the filling nozzle 8 of the first hydrogen filling system 101 and the filling nozzle 18 of the second hydrogen filling system 102 are connected to different vehicles for filling, filling operation is performed as if the filling nozzles 8 and 18 were used for one vehicle. This corresponds to the control according to the third aspect. In that case, communication filling is stopped. As mentioned above, the above-mentioned "premise", which is a premise that to the first hydrogen filling system 101 of the filling nozzle 8 and to the second hydrogen filling system 102 of the filling nozzle 18 are the same signal is sent from the vehicle side (tank 70) is based on that the filling nozzles of the first and second hydrogen filling systems 101, 102 are each connected to two receptacles of a single vehicle. If the filling nozzles 8 and 18 of the first and second hydrogen filling systems 101 and 102 are connected to two receptacles of different vehicles, the "premise" naturally does not hold.

In FIG. 2, the control according to the fourth aspect is a case where both vehicle data obtained by the hydrogen filling control device 10 of the first hydrogen filling system 101 side and the hydrogen filling control device 20 of the second hydrogen filling system 102 side become defective, that is, a case where communication filling is not established on both the first and second hydrogen filling systems 101 and 102. In this case, non-communicative filling is performed on both the first and second hydrogen filling systems 101 and 102. Performing non-communicating filling on both sides allows hydrogen to be filled at a lower filling pressure range than when communicating filling is performed, and filling control is performed to ensure the safety of the vehicle. The fact that both the first and second hydrogen filling systems 101 and 102 do not use vehicle data for filling is displayed on the displays 30 and 40, respectively.

Conditions under which filling is not allowed are stipulated, for example, in the "SAE J2601" standard, and in the illustrated embodiment also, filling control is performed in accordance with the stipulations. The conditions under which filling should not be performed are as follows. When communication filling is not established in the hydrogen filling system on one side, and communication filling is established in the other hydrogen filling system, a temperature of a container on a vehicle side connected to the supply system on the other side exceeds a predetermined value (for example, 85° C.); a fuel supply pressure exceeds a pressure that can be supplied, which is calculated from the temperature of the vehicle-side container connected to the other side supply system; or a supply stop signal is received from the vehicle side in the other side supply system. In any of these cases, filling is stopped. Then, the details of the abnormality that has occurred and the stoppage of filling are displayed on the displays 30 and 40. Since hydrogen filling is stopped in the above case, safety can be ensured in the illustrated embodiment even if hydrogen is filled at a pressure higher than that in non-communicating filling in the systems 101 and 102.

Next, control in the first hydrogen filling system 101 will be described with reference to FIG. 3. FIG. 3 shows only the control on the first hydrogen filling system 101 side. Control on the second hydrogen filling system 102 side will be described later with reference to FIG. 4. In FIG. 3, in step S1, it is determined whether vehicle data (temperature, pressure data) on the side of the first hydrogen filling system 101 can be normally acquired by the hydrogen filling control device 10 (that is, whether communication filling is established or not). In step S1, if the vehicle data on the first hydrogen filling system 101 side can be acquired normally ("Yes" in step S1), the process proceeds to step S2, and if the vehicle data on the first hydrogen filling system 101 side is not successfully acquired ("No" in step S1), the process advances to step S3. In step S2, communication filling is performed in the first hydrogen filling system 101 based on vehicle data (temperature, pressure, etc.) on the first hydrogen filling system 101 side. Then, the process advances to step S6.

In step S3, the hydrogen filling control device 10 of the first hydrogen filling system 101 determines whether or not the vehicle data on the second hydrogen filling system 102 can be normally obtained through the relay 35 and the signal transmission lines 24 and 23 (FIG. 2). As a result of the determination in step S3, if the vehicle data on the second hydrogen filling system 102 side can be acquired normally ("Yes" in step S3), the process advances to step S4, and if the vehicle data on the second hydrogen filling system 102 side cannot be acquired normally ("No" in step S3), the process advances to step S5. In step S4, the hydrogen filling control device 10 of the first hydrogen filling system 101 performs communication filling using the vehicle data on the second hydrogen filling system 102 side (the first aspect). In this case, the display 30 displays that the first hydrogen filling system 101 is performing communication filling using the vehicle data on the second hydrogen filling system 102 side. In step S5, since the hydrogen filling control device 10 of the first hydrogen filling system 101 cannot normally acquire vehicle data of either the first or second hydrogen filling system 101 or 102, the first hydrogen filling system 101 performs non-communication filling without using any vehicle data of the hydrogen filling systems 101 and 102 (the fourth aspect).

In step S6, the hydrogen filling control device 10 of the first hydrogen filling system 101 determines whether or not vehicle data (temperature, pressure, etc.) on the second hydrogen filling system 102 side can be acquired normally through the relay 35 and the signal transmission lines 24 and 23 (FIG. 2). As a result of the determination in step S6, if the vehicle data on the second hydrogen filling system 102 side can be acquired normally ("Yes" in step S6), the process advances to step S7, and if the vehicle data on the second hydrogen filling system 102 side cannot be acquired normally ("No" in step S6), the process advances to step S8. If the vehicle data on the second hydrogen filling system 102 side can be acquired normally ("Yes" in step S6), the first and second hydrogen filling systems 101 and 102 use the vehicle data acquired in each to perform communication filling. If the vehicle data on the second hydrogen filling system 102 side cannot be acquired normally ("No" in step S6), the first hydrogen filling system 101 performs communication filling using the vehicle data of the first hydrogen filling system 101. In step S7, the first hydrogen filling system 101 successfully acquires vehicle data in each of the first and second hydrogen filling systems 101 and 102, and the vehicle data for each is compared (the third aspect). That is, in step S7, the vehicle data in each of the first and second hydrogen filling systems 101, 102 are compared, and if the difference between the two is less than a threshold value, communication filling is continued in the first and second hydrogen filling systems 101, 102. On the other hand, if the vehicle data in each of the first and second hydrogen filling systems 101 and 102 differs by more than a threshold value, communication filling in the hydrogen filling systems 101 and 102 is stopped, and hydrogen filling is performed on the so-called "safe" side by switching to non-communication filling, which fills hydrogen at low pressure. Then, the process advances to step S8.

Through steps S1 to S7, the hydrogen filling control on the first hydrogen filling system 101 side in step S8 is as following (1) to (4).

(1) Communication filling using vehicle data on the first hydrogen filling system 101 side is carried out. At the same time, the second hydrogen filling system 102 also performs communication filling using the vehicle data.
(2) Communication filling using vehicle data on the first hydrogen filling system 101 side. In the second hydrogen filling system 102, communication filling using the vehicle data on the second hydrogen filling system 102 side is not possible.
(3) Communication filling using vehicle data on the second hydrogen filling system 102 side is carried out.
(4) Communication filling using vehicle data on the first and second hydrogen filling systems 101 and 102 is both unsuccessful, and non-communication filling is performed.

In step S8, it is determined whether or not hydrogen filling is being performed. In step S8, if filling is in progress ("Yes" in step S8), the process proceeds to step S9, and if not in filling ("No" in step S8), the process proceeds to step S13.

In step S9 (if filling is in progress), it is determined whether or not filling has ended. Filling is determined to be completed when a predetermined amount of filling is completed and the process ends normally, or when there is some kind of error. For example, if there is an error, there is a case where the above-mentioned "conditions under which filling is not allowed" specified in the standard SAE J2601 are met. In other words, those cases are: if the temperature data of the tank on the vehicle side exceeds a predetermined value (for example, 85 degrees Celsius); if the fuel filling pressure exceeds the pressure that can be filled into the tank on the vehicle side calculated from the temperature data; and if a filling stop signal is received from the vehicle side. In step S10 following step S9, it is determined whether or not the conditions for completing the filling are met. Conditions for completion of filling include, for example, when a predetermined amount of hydrogen is filled (hydrogen filling is completed normally) and when an error specified in the standard SAE J2601 occurs. As a result of the determination in step S10, if the conditions for completing the filling are satisfied ("Yes" in step S10), the process advances to step S11 and the filling is stopped. If the specified amount of hydrogen is filled, the process ends normally, and if an error occurs, the process ends forcefully. If the conditions for completing filling are not satisfied ("No" in step S10), the process advances to step S12, and returns to step S1 to continue filling.

In step S13 (if it is determined in step S8 that the fuel is not being filled: "No" in step S8), it is determined whether or not hydrogen filling by the first hydrogen filling system 101 is possible. At this time, in step S8, it is determined that the filling is not in progress because it is in the preparation stage before filling, or it is determined that the filling is not in progress because the filling has been stopped due to the above-mentioned error, and it is determined whether processing for the error is required. Then, the process advances to step S14. In step S14, it is determined whether or not filling is possible. In step S14, if filling is possible ("Yes" in step S14), the process proceeds to step S15, and if filling is not possible ("No" in step S14), the process proceeds to step S16. In step S15, hydrogen can be filled with the first hydrogen filling system 101, and preparation can be made for the next filling. In step S16, hydrogen filling with the first hydrogen filling system 101 is impossible, and necessary processing is executed.

Next, control in the second hydrogen filling system 102 will be described with reference to FIG. 4. The content of the control in the second hydrogen filling system 102 shown in FIG. 4 is that "the first hydrogen filling system 101" and "the second hydrogen filling system 102" are exchanged in the control in the first hydrogen filling system 101 shown in FIG. 3. In FIG. 4, the control in steps S28 to S36 in the second hydrogen filling system 102 is similar to the control in steps S8 to S16 in the first hydrogen filling system 101 shown in FIG. 3.

With reference to FIG. 5, the display 30 (FIG. 2) on the first hydrogen filling system side and the display 40 (FIG. 2) on the second hydrogen filling system 102 side will be described. Here, the display 30 shown in FIG. 5 is connected to the hydrogen filling control device 10 through a signal transmission line SL10 in FIG. 2, and the display 40 is connected to the hydrogen filling control device 20 through a signal transmission line SL11. In FIG. 2, a "status indicator" and a "total indicator" are displayed on the first hydrogen filling system 101 side, and a "status indicator" is displayed on the second hydrogen filling system 102 side. The devices related to the display and their functions will be described with reference to FIGS. 5 to 7. In FIG. 5, the display 30 has a function of displaying data regarding the first hydrogen filling system 101. The display 30 displays the filling amount (mass flow rate: kg), which is the measured value of the flow meter 3 installed in the supply pipe 31 (FIG. 2), at a location indicated by the symbol A1, and the total filling amount (mass flow rate: kg) of the filling systems 101 and 102 is displayed at the location indicated by the symbol A2, the measured value (MPa) of the pressure gauge 6 is displayed at the location indicated by the symbol A3, and the measured value (C) of the thermometer 5 is displayed at the location indicated by the symbol A4, the filling mode (filling state: communication filling or non-communication filling) is displayed at a location indicated by the symbol A5. The display indicated by the symbol A5 will be described later with reference to FIG. 6. Furthermore, the display 40 in FIG. 5 has a function of displaying data regarding the second hydrogen filling system 102. The display 40 displays the filling amount (mass flow rate: kg), which is the measured value of the flow meter 13 installed in the supply pipe 41 (FIG. 2) at the location indicated by the symbol B1, the measured value of the pressure gauge 16 (MPa) at the location indicated by the symbol B3, the measured value (° C.) of the thermometer 15 at the location indicated by the symbol B4, and the filling mode (filling state: communication filling or non-communication filling?) at the location indicated by reference numeral B5. The display indicated by the symbol B5 will be described later with reference to FIG. 7. The display of "FUEL" at the location indicated by the symbol B2 indicates that "filling is in progress".

Displays representing filling modes indicated by symbols A5 and B5 in FIG. 5 will be explained with reference to FIGS. 6(A) to (C) and 7(A) to (C). FIGS. 6(A) to (C) show a display indicated by the symbol A5, and as shown in FIGS. 6(A) to 6(C), the vertical position of the bar (—) on the left side of "L4" is different. In FIG. 6(A), the bar (—) is at the bottom. This display indicates that data (temperature, pressure, etc.) from the vehicle on the first hydrogen filling system 101 side has been effectively received, and the first hydrogen filling system 101 is performing communication filling using the data. In FIG. 6(B), the bar (—) is at the top. Such a display indicates that the first hydrogen filling system 101 side cannot receive vehicle data, and the first hydrogen filling system 101 performs communication fueling using the vehicle data on the second hydrogen filling system 102 side (the first aspect). In FIG. 6(C), the bar (—) is not displayed. In the case of FIG. 6(C), both the first and second hydrogen filling systems 101 and 102 cannot receive the data (temperature, pressure, etc.) of each vehicle, and both hydrogen filling systems 101 and 102 perform non-communication filling (the fourth aspect).

FIGS. 7(A) to (C) show a display indicated by the symbol B5, and the vertical position of the bar (—) on the left side of "L4" is different in FIGS. 7(A) to (C). In FIG. 7(A), the bar (—) is at the lower level, which shows the data (temperature, pressure, etc.) of the vehicle on the second hydrogen filling system 102 side can be effectively received, and the hydrogen filling system 102 performs communication filling using the data. In FIG. 7(B), the bar (—) is on the upper level, which shows that the data of the vehicle on the second hydrogen filling system 102 side cannot be received, and the second hydrogen filling system 102 performs communication filling using the vehicle data on the first hydrogen filling system 101 side (the second aspect). In FIG. 7(C), no bar (—) is displayed, which means that both the first and second hydrogen filling systems 101 and 102 are unable to receive data for each vehicle, both hydrogen filling systems 101 and 102 are performing non-communication filling (the fourth aspect).

It should be noted that the illustrated embodiments are merely examples, and are not intended to limit the technical scope of the present invention. For example, although the illustrated embodiment describes a case where two hydrogen filling systems 101 and 102 exist, the present invention can be similarly applied to a case where three or more hydrogen filling systems exist. Further, although hydrogen filling is described in the illustrated embodiment, the present invention can be applied to supplying gaseous fuels other than hydrogen. Furthermore, the present invention can also be applied to the supply of liquid fuels such as CNG, LPG, and liquid hydrogen.

DESCRIPTION OF THE REFERENCE NUMERALS 2, 12 flow rate regulating valves
3, 13 flow meters
4, 14 shutoff valves
5, 15 thermometers
6, 16 pressure gauges
7, 17 filling hoses
8, 18 filling nozzles
10, 20 control devices
30, 40 displays
31, 41 filling pipes
50, 60 rear facilities
100 hydrogen filling apparatus
101 first hydrogen filling system
102 second hydrogen filling system

The invention claimed is:

1. A fuel supply apparatus comprising:
a plurality of supply systems;
a supply control device provided in each of the supply systems;
a supply pipe communicating each of the supply systems and rear facilities;
a supply member interposed in the supply pipe and connected to each of the supply control devices; and
a supply hose connected to the supply pipe, said supply hose having a supply nozzle,
wherein each supply control device includes:
a function of determining whether or not communication filling is established in all of the supply systems; and
when communication filling is not established in at least one of the plurality of supply systems and communication filling is established in at least one of the plurality of supply systems, a function of supplying using vehicle side data in the at least one of the plurality of supply systems for which communication filling is established.

2. The fuel supply apparatus as claimed in claim 1, wherein said supply control device has a function of notifying when an abnormality occurs in any of the supply systems.

3. The fuel supply apparatus as claimed in claim 1 further comprising a function of stopping supplying when communication filling is not established in the supply system on the one side and communication filling is established in the supply system on the other side, and
when a temperature of a container on a vehicle side connected to the supply system on the other side exceeds a predetermined value;
when a fuel supply pressure exceeds a pressure that can be supplied to the vehicle-side container that is calculated from the temperature of the vehicle-side container connected to the other side supply system; or
when a supply stop signal is received from the vehicle side in the other side supply system.

4. The fuel supply apparatus as claimed in claim 2 further comprising a function of stopping supplying when communication filling is not established in the supply system on the one side and communication filling is established in the supply system on the other side, and when a temperature of a container on a vehicle side connected to the supply system on the other side exceeds a predetermined value;

when a fuel supply pressure exceeds a pressure that can be supplied to the vehicle-side container that is calculated from the temperature of the vehicle-side container connected to the other side supply system; or when a supply stop signal is received from the vehicle side in the other side supply system.

5. A fuel supply method used for a fuel supply apparatus including: a plurality of supply systems; a supply control device provided in each of the supply systems; a supply pipe for communicating each of the supply systems and rear facilities; a supply member interposed in the supply pipe and connected to each of the supply control devices; and a supply hose connected to the supply pipe, said supply hose having a supply nozzle, said fuel supply method comprising the steps of:

determining whether or not communication filling is established in one side of the supply system and/or the other side of the supply system; and when communication filling is not established in at least one of the plurality of supply systems and communication filling is established in at least one of the plurality of supply systems, supplying using vehicle side data in the at least one of the plurality of supply systems for which communication filling is established.

6. The fuel supply method as claimed in claim 5 further comprising a step of notifying when an abnormality occurs in any of the supply systems.

7. The fuel supply method as claimed in claim 5 further comprising a step of stopping supplying when communication filling is not established in the supply system on the one side and communication filling is established in the supply system on the other side, and when a temperature of a container on a vehicle side connected to the supply system on the other side exceeds a predetermined value;

when a fuel supply pressure exceeds a pressure that can be supplied to the vehicle-side container that is calculated from the temperature of the vehicle-side container connected to the other side supply system; or when a supply stop signal is received from the vehicle side in the other side supply system.

8. The fuel supply method as claimed in claim 6 further comprising a step of stopping supplying when communication filling is not established in the supply system on the one side and communication filling is established in the supply system on the other side, and when a temperature of a container on a vehicle side connected to the supply system on the other side exceeds a predetermined value;

when a fuel supply pressure exceeds a pressure that can be supplied to the vehicle-side container that is calculated from the temperature of the vehicle-side container connected to the other side supply system; or when a supply stop signal is received from the vehicle side in the other side supply system.

* * * * *